United States Patent Office.

JAMES McCABE, OF LEWISTON, MAINE.

Letters Patent No. 72,658, dated December 24, 1867.

IMPROVED COMPOSITION FOR OILING WOOL.

*The Schedule referred to in these Letters Patent and making part of the same.*

TO ALL WHOM IT MAY CONCERN:

Be it known that I, JAMES McCABE, of Lewiston, in the county of Androscoggin, in the State of Maine, have invented an Improved Composition for Oiling Wool; and I do hereby declare that the following, taken in connection with the drawings, which accompany and form part of this specification, is a description of my invention sufficient to enable those skilled in the art to practise it.

The invention relates to the preparation of wool for carding, and consists in the employment, in place of the common oil or oils used in preparing wool, of a composition made up of lard oil, Irish moss, molasses, borax, and ammonia, mixed with soft water, the following proportions being recommended, making up a barrel of the mixture:

Dissolve, in twenty-two gallons of soft water, eight pounds of Irish moss, and add to this solution ten gallons of lard oil, one pound of molasses, four pounds of borax, and one pint of ammonia.

Various kinds of oils are, or have been, in use for treating wool, such, for instance, as olive oil, lard oil, and elaine. Olive oil is not now much used, on account of its high cost. Elaine is so penetrating that it destroys the paint on the machinery, and saturates the wood-work of the cards and jacks; it also tends to destroy the life and strength of the wool, and does not furnish that support and facility in the drawing of the roving into threads afforded by the use of my composition. Elaine oil is also objectionable on account of its strong and unpleasant odor. Lard oil has advantages over the olive and elaine oils, considering its cost at the present time, but this oil gums up the leaders-in, and tumblers, and rub-rollers on the finishers, much more than my composition, besides not furnishing, to an equal degree with said composition, that support, nor imparting that drawing quality to the wool, that is so much needed.

In my invention the lard oil is used to furnish the composition with the oily or greasy matter; the water is used to give quantity or bulk; Irish moss is used to give consistency or body to the composition; the molasses is used because it is found that its addition causes the wool to draw better on the card and in spinning, and the wool does not "fly" so much on the card by the action of the "fancy." It also has a very beneficial effect upon the composition, in imparting to it the quality whereby the wool is kept moist, enabling the wool to be drawn better and much more easily in carding and spinning, it seeming to give support to the roving in drawing into yarn, so that the same stock can be spun much finer with this composition than with clear oil. The borax and ammonia are used to cut the oil and cause it to unite with the water. Either of these will effect this, but though the ammonia acts more thoroughly than the borax, it is of so volatile a nature that it soon evaprates, and the oil and water separate. The borax will hold the oil and water much longer together, and will cause the ingredients to unite, but not so well as when the ammonia is used with it.

In preparing the composition, the moss is boiled in the soft water until dissolved, and the solution is then strained off into the vessel in which the mixture is to be made. The moss-solution is then allowed to cool to about 137°, then the other ingredients are added, and the mixture is stirred until a perfect union has taken place. It is then ready for use.

The cost of this composition is but about one-third of the cost of a good quality of lard oil.

I claim, as a substitute for oil in preparing wool for carding and spinning, a composition made up of the ingredients, substantially as described.

JAMES McCABE.

Witnesses:
WILLIAM DENNEY,
D. M. AYER.